United States Patent [19]

Maue et al.

[11] Patent Number: 5,040,168
[45] Date of Patent: Aug. 13, 1991

[54] SINGLE WIRE, INFRARED, RANDOMLY REFLECTED, VEHICULAR MULTIPLEXING SYSTEM

[75] Inventors: H. Winston Maue, Farmington Hills; Robert A. Jack, Redford, both of Mich.

[73] Assignee: United Technologies Automotive, Inc., Dearborn, Mich.

[21] Appl. No.: 375,093

[22] Filed: Jun. 30, 1989

[51] Int. Cl.⁵ .............................................. H04J 14/00
[52] U.S. Cl. ...................................... 359/115; 359/142
[58] Field of Search .............. 455/601, 603, 606, 607, 455/608, 617; 370/3, 4, 1; 340/425.5, 307

[56] References Cited

U.S. PATENT DOCUMENTS

| | | | |
|---|---|---|---|
| 3,924,120 | 12/1975 | Cox | 250/199 |
| 4,143,368 | 3/1979 | Route | 455/603 |
| 4,227,588 | 10/1980 | Biancardi | 180/167 |
| 4,402,090 | 8/1983 | Gfeller | 455/607 |
| 4,534,025 | 8/1985 | Floyd | 375/85.11 |
| 4,598,237 | 7/1986 | Wada et al. | 318/16 |
| 4,616,224 | 10/1986 | Reighard | 455/603 |
| 4,635,029 | 1/1987 | Yamada | 455/603 |
| 4,850,040 | 7/1989 | Teich | 455/603 |
| 4,930,049 | 5/1990 | Davenport | 455/63 |

FOREIGN PATENT DOCUMENTS

| | | | |
|---|---|---|---|
| 0149238 | 11/1981 | Japan | 370/4 |
| 0149239 | 11/1981 | Japan | 370/4 |

OTHER PUBLICATIONS

Descriptive Material on TYRON—Remote Control Power Booster.
Descriptive Material, "Audiovisual Accessories from Kodak".

*Primary Examiner*—Reinhard J. Eisenzopf
*Assistant Examiner*—Leslie Pascal

[57] ABSTRACT

A vehicular, infrared, multiplexing system controlling various vehicular or automotive electrical function loads, such as, for example, lights, window motors, seat motors, door locks, engine start and the like, wherein control and sensing signals are transmitted within the interior of the vehicle by randomly reflected, infrared radiation or similar optical energy carrying electronically intelligible information. The infrared system does not require or rely on direct, light-of-sight or controlled reflection or a continuous optical circuit, but instead relies on randomly reflected, scattered, diffused, infrared radiation reflected from various interior surfaces of the vehicle, including, for example, practically all interior surfaces, such as the windshield, side and rear windows, seats, headliner, instrument panel, rear window, door trim panels, etc. One or more central transmitter/receivers are included in the vehicle's interior, including the instrument panel using the windshield, the rear of the center console using the headliner, and/or in the rear package deck using the rear window. A serial, multiplex transmission with half-duplex, serial data bi-directionally format is used, including a sync code alerting the load devices of transmission start, a unique vehicle code (e.g., the VIN), the central control unit's MUX command, the central unit's cyclic redundancy error checking code, remote unit address, remote's MUX response, and remote's cyclic rendundancy code. Because all system information is transmitted by infrared, only one wire, used for twelve volt DC power, is required to each of the load units, with the vehicular chassis serving as ground return.

18 Claims, 4 Drawing Sheets

SINGLE WIRE, INFRARED, RANDOMLY REFLECTED, VEHICULAR MULTIPLEXING SYSTEM

DESCRIPTION

1. Field of Invention

The present invention relates to automotive or vehicular multiplex control systems, particularly for controlling various automotive or vehicular electrical function loads, such as for example, lights, window motors, door locks, seat motors, trunk lid, and the like, particularly from within the vehicle. More particularly, the present invention relates to such a system in which only a single hard wire for providing, for example, twelve (12 v) volts of DC power to each of the loads is necessary, with the communications between the control module and the various loads being accomplished by diffused, randomly reflected optical means, such as for example, infrared or similarly suitable optical energy transmitted through the air within the interior of the vehicle, diffusely reflected in a random manner by the various interior surfaces of the vehicle. The various interior surfaces used to reflect the optical energy include, for example, the interior side of the windshield, headliner, instrument panel, rear package tray or shelf, carpeting, upholstery and door trim panels, etc.

2. Background Art

Historically, control of automotive loads such as lights, window motors, seat motors and the like has been through the connection or disconnection of the power circuitry with a separate control/power circuit being required for each load.

In recent years, automotive multiplex systems have been developed, which extend a major power bus to the various loads, but which rely on a two to approximately five wire data network to convey serial, multiplexed control data to a local logic component at each of the loads for causing connection of the power to the load at that location. Note, for example, assignee's patent to Floyd (U.S. Pat. No. 4,534,025 issued Aug. 6, 1985), the disclosure of which is incorporated herein by reference, and the prior art cited therein.

This has eliminated the need for a number of power conductors to the various loads, although, as mentioned, it still does require a network of, for example, two to five small data wires. Moreover, such data wires are very susceptible to problems caused by electromagnetic interference (EMI), and open circuits and short circuits caused by sharp edges.

The present invention is intended to reduce the need for data wires in a multiplexed system, along with their concomitant susceptibility to EMI and short or open circuits.

As a broad proposition the use of an infrared communication system in association with automobiles generally is known, as shown for example by the patents to Route et al (U.S. Pat. No. 4,143,368 issued Mar. 6, 1979) and to Biancardi (U.S. Pat. No. 4,227,588 issued Oct. 14, 1980). However, both of these patents are directed to external communications, in which an external transmitter, typically hand-held, is used to control various automotive functions. Such systems typically require direct "line-of-sight" from the user, located externally to the vehicle, to a sensor located or positioned on the exterior surface of the vehicle.

The patent to Wada et al (U.S. Pat. No. 4,598,237 issued July 1, 1986) discloses a "power window control apparatus" in which a removable, infrared transmitter is used to control the opening and closing of automotive windows in a retro-fit type of situation. Typically, the control transmitter is left in a fixedly mounted bracket to control the front windows and then removed to control the rear windows, the fixed bracket having a switch located within it to sense when the hand-sized transmitter is positioned within it and when it has been removed. However, again, the signal is transmitted in a direct, line-of-sight manner.

The patent to Cox (U.S. Pat. No. 3,924,120 issued Dec. 2, 1975) is directed to the non-analogous art of a theater remote control system utilizing an infrared emitter for controlling, for example, a lighting system in the theater. The infrared communications system utilizes a single wire power source system to power various loads having respective infrared detector/receiver units tuned to respond to particular carrier frequencies. The patent notes that what is required between the transmitter and receiver is a continuous optical circuit, for instance, furnished by open space, mirrors, lenses, fiber optic bundles, or the like. Within the context of this patent, the reference to the word "mirrors" indicates a reliance upon the controlled, directly in-line reflection rather than a random, diffuse reflection of the optical signal, as occurs in the present invention.

DISCLOSURE OF THE INVENTION

The present invention utilizes a randomly reflected optical energy system in the interior of a car or other vehicle for transmitting or communicating electronically intelligible information between a central control or master module and remote or slave modules for the vehicular electrical functions, such as, for example, infrared transmitters and receivers for sensing and controlling various electrical load functions present in the vehicle. Paired infrared receivers and "answer-back" transmitters could be located, for example, in the doors, instrument panel, console, rear package tray, headliner, etc., to be controlled by a central or master control with its primary transmitter and secondary receiver.

The interior surfaces of the vehicle, including, for example, the windshield, the side and rear windows, seats, headliner, interior trim panels, rear package tray or shelf, etc., are used to randomly and diffusely reflect the infrared signals between the primary or master transmitter(s) and the slave receivers at the various electrical load functions.

With such a system, only one common wire is required for each module providing, for example, twelve (12 v) volt DC power to it, with the battery and each load being grounded to the vehicle chassis to complete the circuit. Thus, the present invention eliminates large wire bundles, which have been becoming too large to be routed throughout the vehicle. For example, current multiplex automotive systems require typically two to five wires for communications and power, while the system of the present invention, for example, reduces the required wire count to only one wire, namely the power wire.

By reducing the number of wires going to each load element, the present invention, not only simplifies manufacturing processes but also, in eliminating the large wiring bundles, reduces electromagnetic interference, which could otherwise occur in the presence of extensive wiring. Additionally, the present invention eliminates the need for a communication bus necessary to implement option addition, as required in prior art multiplexing systems.

Thus, the present invention conveys the data between the central control or master module and the various remote or slave modules optically, utilizing for example, infrared radiation. Additionally, it does this without the use of "hard" fiber optic lines but instead transmits the infrared or similarly suitable optical energy "through the air" within the vehicle from a transmitter to one or more receivers. Additionally, to accommodate for intermediate blockage or absorption, the system of the present invention relies on a scattering technique, by which transmitted energy is randomly and diffusely reflected from various, naturally occurring surfaces in the vehicle to the various receivers and does not rely on direct, line-of-sight transmission or controlled reflection using particularly positioned reflective surface(s) or mirror(s).

Typically, the signal from any one primary or control transmitter is received at every receiver, and there are a number of transmitter/receiver modules located spaced throughout the vehicle, with the transmitters at the receiver modules being "answer-back" transmitters. Also, the communications system utilized in the present invention preferably includes a unique vehicle code to protect against infrared energy being received from one vehicle controlling or misinforming another vehicle.

As described in greater detail below, the preferred embodiment of the present invention includes a one-wire, multiplex system implemented by utilizing a central computer to control the system communications which occur in a time-division, serial fashion, with the vehicle chassis serving as the return or ground path for the electrical circuit. The central computer interrogates all system inputs via a paired infrared receiver, one at a time, noting any changes that occur in their states as transmitted from the remote modules. It then controls the system outputs by transmitting the appropriate commands using the primary or control infrared transmitter. Preferably each electronic module will have a paired infrared transmitter and receiver, each with a unique address, to form, for example, a bi-directional, optical communications link, although such is not necessary to the invention.

For example, the system can employ a serial multiplex transmission format that includes transmitting half-duplex, serial data bi-directionally. Each serial data transmission between the central module and a remote module contains, for example, a sync code used to alert the devices of a transmission start, a unique vehicle code (such as for example the vehicle identification number-VIN), the central console's MUX command, the central console's cyclic redundancy code (for error checking), the remote module's address, the remote module's MUX response, and the remote module's cyclic redundancy code.

The present invention allows many options to be added easily, possibly at the dealer level. A group of options can be added by installing a remote electronics module and connecting it to an output harness. The remote module should contain all of the input switches required and be installed, for example, into the existing trim panel.

Infrared remote systems can be implemented with just the addition of a hand-held transmitter, which would act like a remote module with its own unique address. Thus, many functions could be controlled from outside the vehicle with the remote transmitter, including, for example, theft alarm, illuminated entry, memory seat position, trunk unlock, door lock and unlock, window(s) up and down, lights "on" and "off," and even remote starting, if so desired.

The foregoing and other features and advantages of the present invention will become more apparent from the following description and drawings.

BEST MODE FOR CARRYING OUT THE INVENTION

Figure 1:
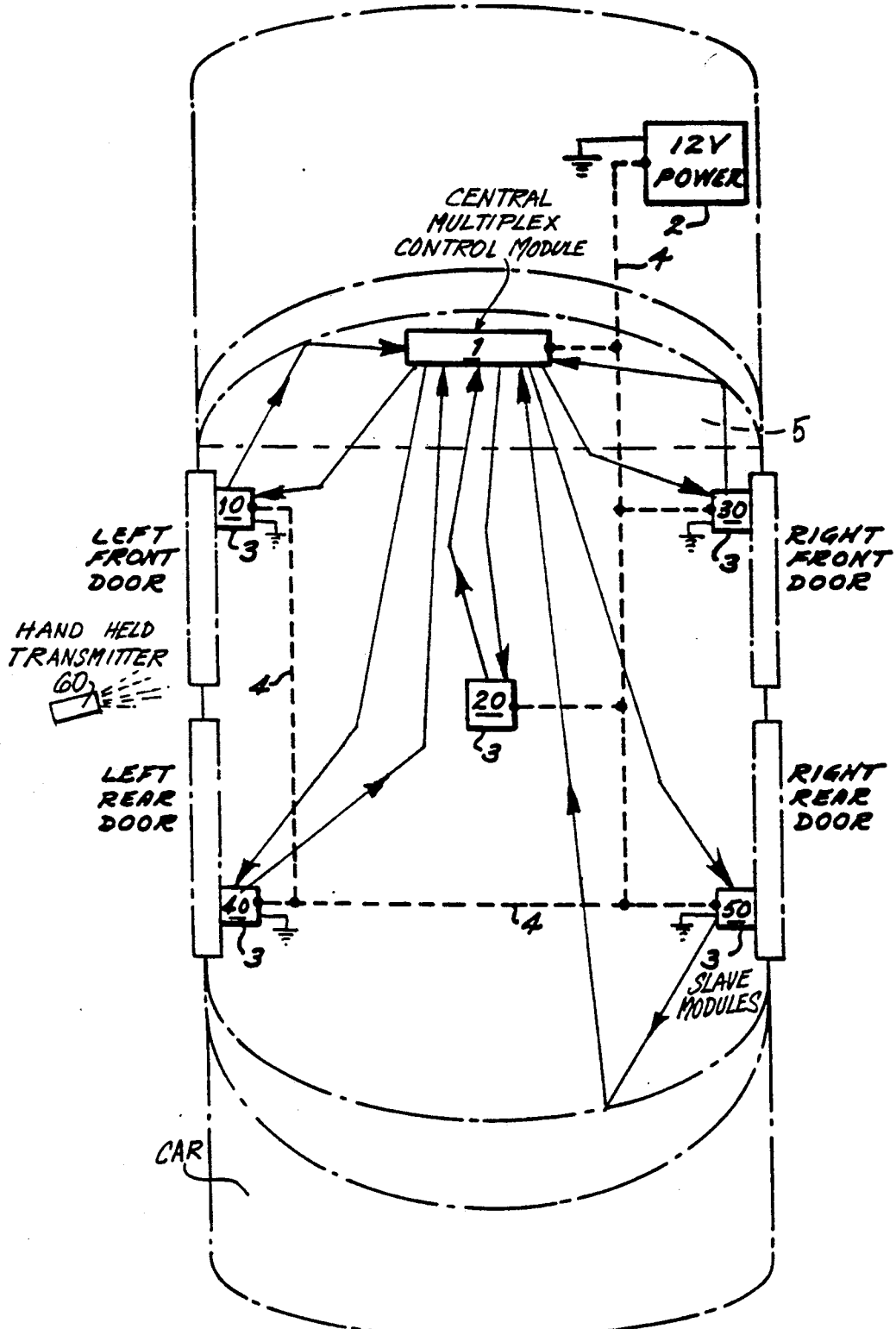
FIG. 1 is a schematic, simplified view generally illustrating the transmission of the control and system information optically between the central or master module of the vehicle and the various remote modules for the exemplary automotive loads present in the vehicle, it being noted that the large, straight, directional arrows of the figure do not represent the actual paths of the received and transmitted optical rays, which instead are diffused in their travel with typically multiple reflections before reaching their targets, but rather only the relative directions of information flow to and from the central infrared communications module.

As can be seen in FIG. 1, a central or master multiplex control module 1 powered by, for example, a twelve volt (12 v) DC battery power source 2 and grounded to the vehicle chassis communicates with a series of remote or slave modules 3 spaced throughout the interior of an automotive vehicle. The controls for the master module 1 are preferably located in the vehicle close at hand to the driver, in, for example, the instrument panel or dashboard or console 5.

An exemplary five remote modules 3 are provided, namely a left front door remote module 10, a console remote module 20, a right front door remote module 30, a left rear door remote module 40, and a right rear door remote module 50. The remote door modules 10, 30, 40 & 50 can be used to control for example the motors or actuators for the vehicle's power windows and door locks, respectively, while the console remote module 20 can be used for example to control a multiple number of electrical function loads, such as for example the seat positioning and adjusting motors, the vehicle's lights, including the interior light(s) and the dashboard or panel light(s), etc. Additional exemplary electrical function loads are the side view mirrors, the trunk lid, sound system controls, environmental controls, etc.

Figure 2:
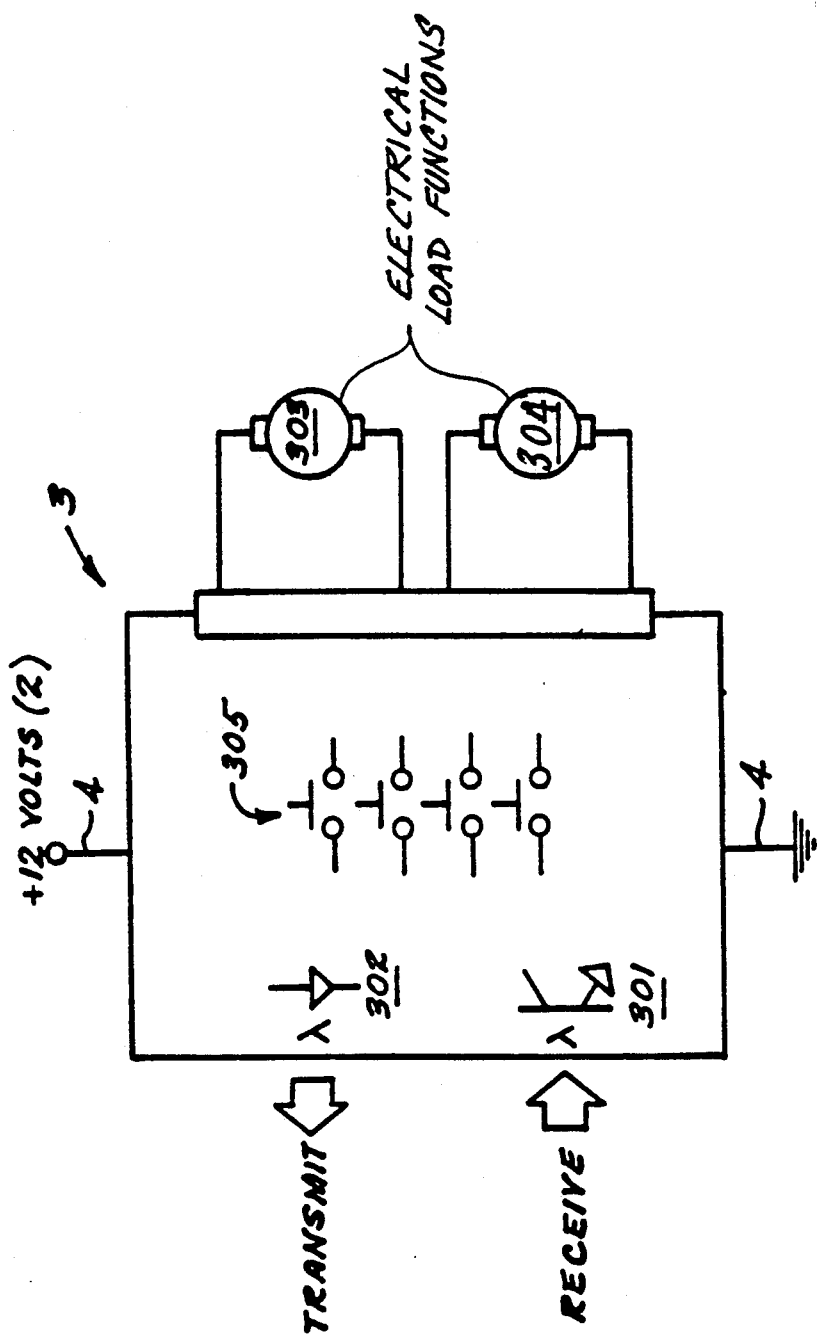
FIG. 2 is a simplified, schematic view of an exemplary remote electronic module used in the exemplary, preferred embodiment of the present invention.

Each remote module 3, as can be seen in the schematic of FIG. 2, is electronic and contains both an optical receiver 301 and an optical energy transmitter 302 paired together, the optical energy used to communicate between unpaired transmitters and receivers, that is, a transmitter and a receiver which is not part of the same module, preferably being infrared or based or some other suitable electromagnetic radiation waves. As can be seen both in FIGS. 1 & 2, only a single electrical line 4 goes to each of the remote modules 3, namely a twelve volt power line 4 from the DC power source or battery 2, with several of them connected together in series, if so desired, and with all of them grounded to the chassis to complete the electrical circuit. This wire 4 is the only hard wire connection necessary from the power source, none being needed for control, and even this one could be eliminated in module(s) with independent electrical loads having their own self-contained, preferably rechargeable battery power source.

As further shown in FIG. 2, the remote electronic module 3 can control not only one but a multiple number of function loads, for example two, namely, electrical load functions 303 & 304, which for the door remote modules can be, for further example, the power window motor and the power door lock actuator. A series of switches 305 are optically or electronically controlled based on the type of system used and the information received by the optical (infrared) receiver 301. These switches 305 in turn control the directly associated or attached electrical function loads 303 & 304, or they can be used to pass on the signals to other associated loads not directly attached to the module 3 by, for example, causing the signals to be re-transmitted in the form of "passed on" infrared signals to another module. In the latter role, the "remote" module 3 is serving as, in essence, a central module, in similar fashion to that of the central module 1. Thus, the "remote" modules 3 can also be considered "central" or "control" modules.

The electrical circuitry and component details for the central control module 1 and the remote modules 3 and the electronic component details for, for example, the components 301–305 are well known to those of ordinary skill, and, for the sake of simplicity and brevity, they are not repeated here.

Optical energy in the form of, for example, infrared electromagnetic radiation is transmitted out from each of the transmitters of the remote and the central modules and ultimately is received by all of the receivers of the remote and the central modules, typically after a number of random reflections of the received ray(s) off of various interior parts of the vehicle. Thus, the path of travel of the infrared radiation waves is not direct in a line-of-sight or controlled reflection manner, but rather goes through a series of random reflections as they impinge on the various interior surfaces found in the vehicle, including for example the interior side of the windshield, side and rear windows, seats, headliner, instrument panel, carpeting, upholstery, door trim panel, etc. Direct, in line-of-sight impingement or controlled reflection is not necessary or expected in the preferred embodiment and would not typically occur.

With respect to the interior side of the windshield, the reflective characteristics of a windshield having a defogging coating of, for example, a solution containing, for example, three quarters of an ounce (¾ oz.) silver, may be particularly effective in producing diffused reflections of the infrared signals. In such an instance, particularly the central transmitter and possibly also the remote transmitters, to the extent feasible, could be primarily directed toward it.

Thus, the rays are scattered and are diffused in their travels from their original transmitter to ultimately each of the receivers, at least with respect to the central master transmitter to all of the remote slave receivers, and all of the remote slave transmitters to at least the central master receiver.

Exemplary, preferred locations of the central transmitter/sensor or receiver are illustrated in FIGS. 1–5.

Figure 3:
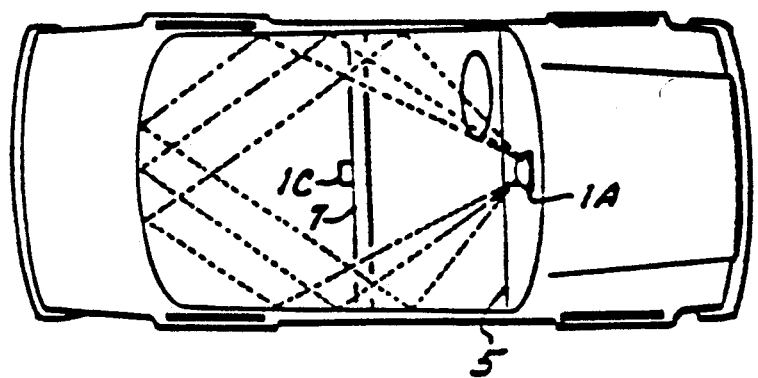
FIGS. 3, 4 & 5 are generalized top, rear and side views, respectively, of an automotive vehicle showing various exemplary placements of the master transmitter/receiver pair of the central module and exemplary ones of the randomly reflective optical rays emanating from the central transmitter.
Figure 5:
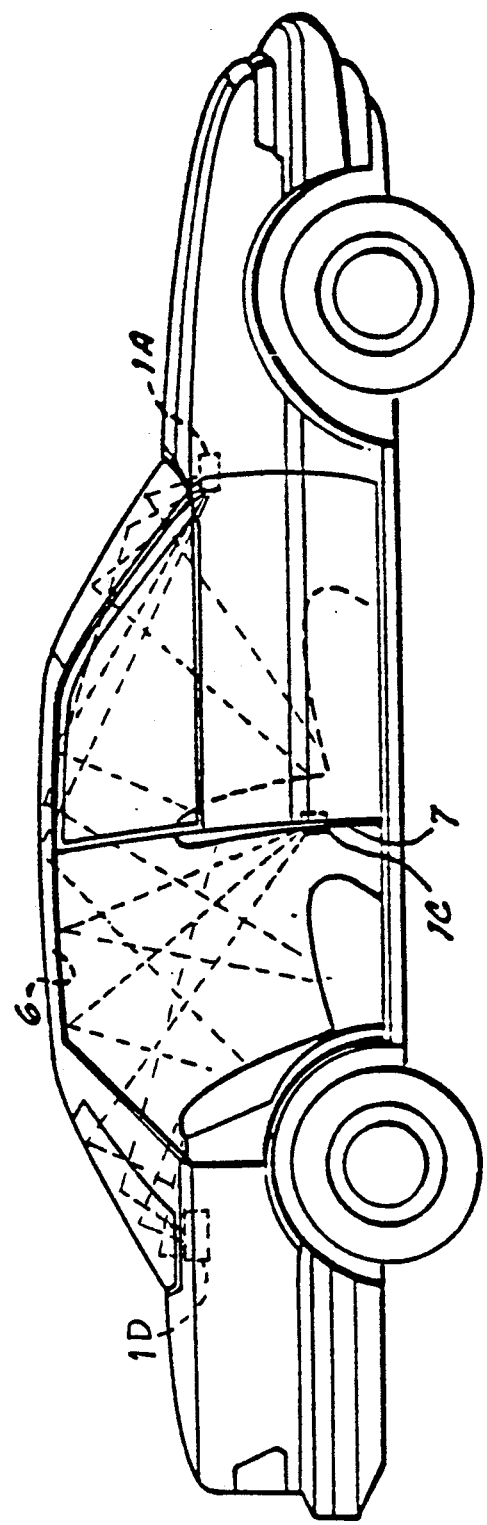

As can be seen in FIGS. 3 & 5, the central transmitter/sensor 1A can be located on the top of the dashboard or instrument panel 5, preferably directed at least in part against the interior side of the windshield, as well as forwardly up against the headliner 6. Such directionality produces a highly spread out, optical ray field (note exemplary dashed lines), which gives a high rate of assurance that each transmission from the central transmitter 1A will be received by each of the sensors or receivers 301 associated with each remote module 3, usually each receiving a number of rays, each of which has been bounced or reflected off of a number of different interior surfaces in a randomly reflected, diffuse manner.

Such multiple signal paths are desirable to assure receipt of the transmitted signal in spite of a varying number of, or the movement of, occupants or of "baggage" which might be moved about or randomly placed, blocking one or more signal paths in the vehicle. Indeed, with the desired diffused approach of the present invention, the presence of such "obstacles" will perhaps further reflect the transmitted signals and further enhance the diffused nature of the transmitted optical signal, as it randomly travels in random fashion over multiple paths to the receiver(s).

Figure 4:
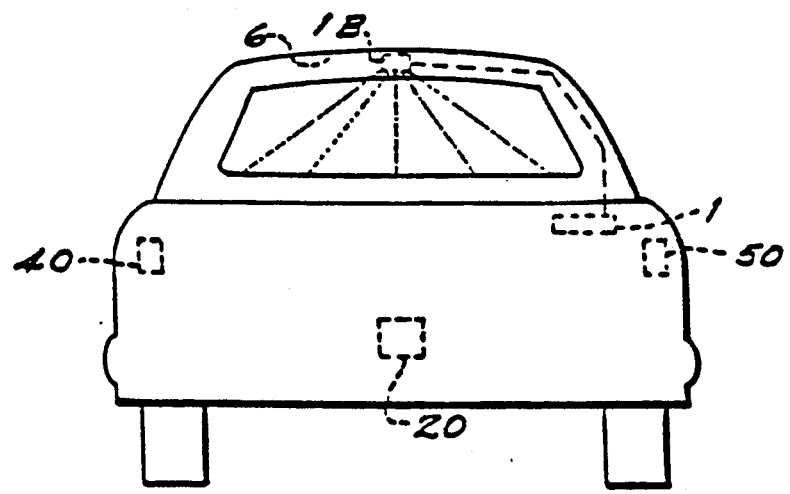

In the alternate embodiment of FIG. 4, the central transmitter/sensor 1B associated with the central master control 1 is located in the center of the headliner 6 of the roof. The embodiment of FIGS. 3 & 5 also can include, as illustrated, a supplemental transmitter/sensor or receiver 1C for the remote modules located in the rear compartment of the vehicle in the area, preferably, of the central console which extends between the two front seats in many automotive vehicles. The transmitter/sensor 1C is preferably located behind the backside 7 of the front seats in the center near the floor.

An additional, advantageous location for the central transmitter/receiver or a supplemental central transmitter/receiver is in the back package tray, deck or shelf below the rear window with the transmitter directed up toward the interior side of the rear window, as exemplified by the transmitter/receiver 1D of FIG. 1. The diffused nature of the optical ray field produced by the transmitter of the module 1D and the collection of rays to be received by the receiver of the module 1D are enhanced by the typical compound curvature of the interior surface of the rear window, as is also the case for the interior surface of the front windshield.

In all of these examples for the central transmitter/sensor 1A, 1B, 1C & 1D, the infrared ray pattern or field again is very spread out and transmitted to the various remote sensors 301 with random, diffused reflections.

The central module 1 includes a computer which controls the system communications, which communications occur preferably in a time division, serial fashion. The central computer interrogates all system inputs via the infrared receivers 301, one at a time, noting any changes that occur in their states, as transmitted from the remote modules 3 from their transmitters 302.

The central computer then controls the system outputs by transmitting the appropriate commands using its infrared transmitter. Each electronic remote module 3 has a unique address to form a bi-directional optical communication link in the system.

Preferably, the system employs a serial, multiplex transmission format that includes transmitting half-duplex, serial data bi-directionally. Each serial data transmission between the central module and a remote module 3 preferably contains in electronically intelligible form—a sync code used to alert the modules of the transmission start, a unique vehicle code (such as for example the vehicle's identification number—VIN), the central unit's MUX or multiplexing command, the central unit's error checking code (e.g. a cyclic redundancy code—CRC), the remote module's unique address, the remote module's MUX response, and the remote module's error checking code (e.g. CRC).

It should be understood that the approach of the system of the present invention allows many options to be easily added to a vehicle, for example at the vehicle dealer's level. A group of options can be added, for example, by installing a remote electronics module and connecting it to a power output harness with a ground to the chassis. The remote module for a door should contain all of the input switches required and be installed into or behind, for example, the existing trim panel.

An infrared remote system can be implemented, if desired, with the addition of, for example, a hand-held, preferably pocket-sized transmitter 60 (note FIG. 1), which acts like a remote module with its own unique address. Thus, many vehicle functions can be controlled from outside the vehicle with such a remote transmitter. Functions, such as for example, theft alarm, illuminated entry, memory seat position, trunk unlock, door lock and unlock, window(s) up and down, lights "on" and "off," and even remote engine starting can be included, if desired, within the functions controlled by the remote, exterior unit. This again merely involves the adoption of appropriate circuitry and encoding, in an appropriate manner known to those of ordinary skill in the art.

Utilizing transmitters and receivers which can communicate from randomly reflected, scattered signals requires either relatively more powerful transmitters and/or relatively more sensitive receivers than ones using direct, line-of-sight or controlled reflection or closed optical circuits for the transmitted and received signals. To in part obviate this requirement, some complementary channeling of the signals can be used, if desired, by, for example, appropriately positioning the central control module and/or supplying limited controlled reflection of the signals using, for example, fiber optic channels.

Thus, for example, pick-up and transmitting fiber optic elements having ends that terminate at the front and back of the front row of seats with their other ends extending to the transmitter and receiver of the central control module 1 could be used with, if desired, the central module located, for example, under the front seat structure. However, still randomly reflected signals are utilized in the transmission to at least some of the remote receivers or to the central transmitter from at least some of the remote transmitters, only the efficiency of the received signal strength being enhanced.

Some exemplary, "off-the-shelf" randomly reflective infrared transmission and sensor systems, modified parts of which could be used in the present invention, are found in the Hewlett-Packard calculator Model 28C and its associated printer Model 82240A, which intercommunicate with randomly reflected infrared signals, as well as the "TYRON"(TM) remote control power booster by Orion Alpha Corp. of Santa Clara, Calif. The latter is used in essence to amplify the standard, direct line-of-sight video cassette recorder (VCR) and TV infrared controls, so that they are able to work more in a randomly reflective manner.

In the latter "TYRON" "off-the-shelf" example, the standard hand-held infrared control unit is placed in the "amplifying" unit, with the two in combination controlling the VCR or TV with somewhat randomly transmitted signals. The "TYRON" unit uses a solid state multi-stage amplifier design to optimize maximum power output with low power consumption driving multiple infrared light-emitting diodes (LEDs) for maximum signal strength. Additionally, a curved translucent window is used to increase signal dispersion.

Another "off-the-shelf" item of interest is the infrared remote control sub-system provided by the Eastman Kodak Co. as the "KODAK EKTAGRAPHIC"(TM) IR remote control for controlling slide projectors. The infrared receiver "sees" a full three hundred and sixty (360°) degrees, and the signal can be bounced off a projection screen or a light-colored wall to the receiver.

Although this invention has been shown and described with respect to detailed embodiment(s) thereof, it should be understood by those skilled in the art that various changes in form, detail, methodology and/or approach may be made without departing from the spirit and scope of the invention.

Having thus described at least one exemplary embodiment of the invention, that which is new and desired to be secured by Letters Patent is:

We claim:

1. A multiplexing system for a vehicle controlling various vehicular electrical function loads, such as lights, window motors, seat motors and door locks, comprising:

at least one optical energy, control, central transmitter and a multiple number of optical energy, remote, slave receivers capable of communicating with at least said control transmitter, said receivers being located and spaced around in various, spaced parts of the interior of the vehicle, there being at least one electrical function load associated with each receiver and controlled by the multiplexing system, at least some of the receivers being located out of a direct, line-of-sight with the transmitter with which it communicates, said control transmitter including optical energy means for having the information between said control transmitter and said receivers being transmitted by optical energy traveling in a random, scattered, diffused manner randomly reflected off the interior surfaces of the interior of the vehicle a multiple number of times as it travels between said receivers and the transmitter with which each communicates and by which electronically intelligible information is transmitted;

a central control module located in the vehicle having said control transmitter associated therewith; and a series of remote modules, at least one module associated with each of said receivers associated with each of the function loads.

2. The vehicular multiplexing system of claim 1, wherein each transmitter also includes a receiver and has transmission means for transmitting electronically intelligible information optically bi-directionally in the form of half-duplex, serial data, the information included in said information transmission being bi-directionally transmitted in the form of half-duplex, serial data.

3. The vehicular multiplexing system of claim 2, wherein the information included in said electronically intelligible information transmission includes at least the following:
   a synchronization code;
   a unique vehicle code;
   command/sensor information;
   error checking code; and
   addressing code uniquely identifying at least one of said receivers.

4. The vehicular multiplexing system of claim 3, wherein the information included in said electronically intelligible information transmission further includes at least the following:
   command information from said central module, and response information from the receiver(s) uniquely addressed by said addressing code.

5. The vehicular multiplexing system of claim 3, wherein said unique vehicle code is based on an identification number associated with the vehicle (VIN).

6. The vehicular multiplexing system of claim 3, wherein said error checking code includes a cyclic redundancy code (CRC).

7. The vehicular multiplexing system of claim 1, wherein there is further included only one electrical wire operating as part of the multiplexing system going to each of said function loads being controlled by the multiplexing system.

8. The vehicular multiplexing system of claim 7, wherein said one electrical wire is a power wire supplying DC power to its respective electrical function load.

9. The vehicular multiplexing system of claim 1, wherein said vehicle includes an instrument panel with an upper surface and a windshield, and wherein:
   said control transmitter is centrallized and located at the upper surface of the instrument panel directed upwardly toward the interior surface of the vehicle's windshield, with said optical energy being reflected off of said windshield in a diffused manner.

10. The vehicular multiplexing system of claim 1, wherein said vehicle includes a rear shelf and a rear window located right above said rear shelf, and wherein:
    said control transmitter is centralized and located at the upper surface of said rear shelf directed upwardly toward the interior surface of the vehicle's rear window, with said optical energy being reflected off of said rear window in a diffused manner.

11. The vehicular multiplexing system of claim 1, wherein the vehicle includes two, spaced front seats and a center console located between the two front seats, with the console having a rear end, and wherein:
    said control transmitter is located toward the rear end of said center console behind said front seats.

12. The vehicular multiplexing system of claim 11, wherein:
    said control transmitter is directed upwardly toward the headliner of the vehicle, with said optical energy being reflected off of said headliner in a diffused manner.

13. A method of controlling in a vehicle various vehicular electrical function loads, such as lights, window motors, seat motors and door locks, with a vehicular multiplexing system, comprising the following steps:
    (a) providing at least one optical energy, control transmitter and a multiple number of remote, slave, optical energy receivers capable of communicating with said control transmitter located and spaced around in various parts of the interior of the vehicle, said transmitter being associated with a control module and said receivers being associated with remote modules, at least some of said remote receivers being out of a direct, line-of-sight with the transmitter with which it communicates, there being at least one electrical function load associated with at least one remote receiver controlled by the multiplexing system; and
    (b) transmitting electronically intelligible information between said control transmitter and said remote receivers by transmitting optical energy traveling in a random, scattered, diffuse manner randomly reflected off of the interior surfaces of the interior of the vehicle as it travels to said remote receivers from said transmitter in communicating the information to said receivers.

14. The method of claim 13, wherein step "b" includes the step(s) of:
    (b-i) transmitting electronically intelligible information from said control transmitter to at least some of said remote receivers using a central transmitter located at the upper surface of the rear package deck directed up toward the rear window, using the reflection of the optical energy off of the rear window to create at least in part the random, scattered, diffuse reflections.

15. The method of claim 13, wherein there are a multiple number of remote receivers each having at least one associated electrical function load, and wherein step "b" includes the step(s) of:
    (b-i) transmitting electronically intelligible information from said control transmitter to said remote receivers, including
    a synchronization code used to alert the receivers of transmission start;
    a unique vehicle code;
    command/sensor information;
    error checking code; and
    addressing code for individually addressing said receivers, said information at least in some instances causing the remote receivers to alternately activate and deactivate switches controlling their associated electrical function loads.

16. The method of claim 13, wherein there are a multiple number of remote receivers each having at least one associated electrical function load, and wherein in step "a" there is included the step(s) of:
    (a-i) providing only one electrical wire operating as part of the multiplexing system going to each of said function loads being controlled by the multiplexing system, said one electrical wire being a power wire supplying DC power to its respective electrical function load.

17. The method of claim 13, wherein step "b" includes the step(s) of:
    (b-i) transmitting electronically intelligible information from said control transmitter to at least some of said remote receivers using a central transmitter located at the upper surface of the instrument panel directed up toward the windshield, using the reflection of the optical energy off of the windshield to create at least in part the random, scattered, diffuse reflections.

18. The method of claim 13, wherein step "b" includes the step(s) of:

(b-i) transmitting electronically intelligible information from said control transmitter to at least some of said remote receivers using a central transmitter located toward the rear end of a center console behind the two front seats of the vehicle directed up toward the headliner, using the reflection of the optical energy off of the headliner to create at least in part the random, scattered, diffuse reflections.

* * * * *